March 7, 1933.  J. BAUGNÉE  1,900,787
COUPLING OR CLUTCH FOR COAXIAL SHAFTS
Filed June 19, 1931
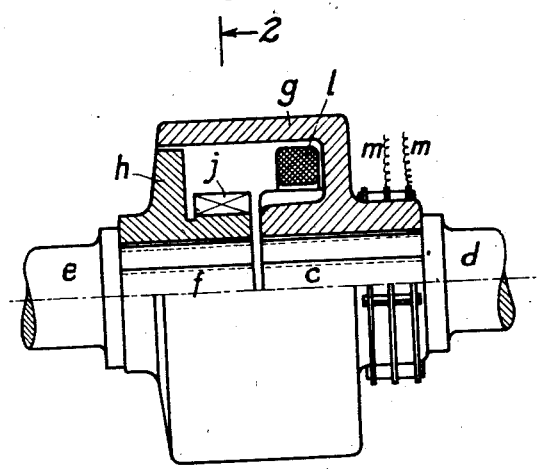
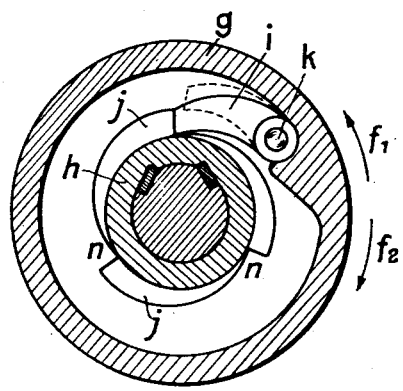
Inventor:
JUSTIN BAUGNÉE
by his attorneys
Howson and Howson Patented Mar. 7, 1933

1,900,787

UNITED STATES PATENT OFFICE

JUSTIN BAUGNÉE, OF DIFFERDANGE, LUXEMBURG

COUPLING OR CLUTCH FOR COAXIAL SHAFTS

Application filed June 19, 1931, Serial No. 545,574, and in Germany April 15, 1930.

This invention relates to couplings or clutches for co-axial shafts, which enable the shafts to be coupled together in either direction of rotation without consideration to the fact as to which of the shafts constitutes the driving shaft, and which also, in the one direction of rotation, permit of advance motion on the part of the driven shaft in relation to the driving shaft.

This object is accomplished by the use of a compound clutch, which comprises a one-way clutch for the one direction of rotation and an electro-magnetic clutch for the opposite direction.

According to one form of embodiment of the invention, the hub of the one coupling element of the electro-magnetic clutch possesses the locking teeth on its outer periphery, while the casing for the magnet coil of the other coupling element carries on its inner periphery the pawls of the one-way clutch. When in a clutch of this description the one-way clutch, which is effective only in the one direction, is in operation, the driven shaft is capable of advance motion in relation to the driving shaft, as in this direction the pawls are passed away over the teeth. If the driving and driven shafts are exchanged, the one-way clutch operates in the reverse direction.

The invention will now be described more fully with reference to the accompanying drawing, in which Fig. 1 is an elevational view of the clutch, partly in section, and Fig. 2 a section according to the line 2—2 of Fig. 1.

Referring now to the drawing, the co-axial shafts $d$ and $e$ to be coupled are furnished with the oppositely disposed coupling portions $c$ and $f$. The part $c$ carries the casing $g$ for the coil $l$ of the electro-magnetic clutch, while the part $f$ carries the second coupling element $h$, about the outer periphery of which are disposed the teeth $j$.

The inner periphery of the casing $g$ carries by means of trunnions $k$ the pawls $i$, of which only one is shown. Upon rotation of the shaft $d$ in the direction of the arrow $f1$ the pawls $i$ move against the end faces $n$ of the teeth $j$. In this case, therefore, $d$ is the driving shaft. If on the other hand $e$ is the driving shaft, the end faces $n$ move against the pawls $i$. If rotation occurs in the direction of the arrow $f2$, the clutch runs idly. For the purpose of coupling in this direction of rotation, the coil $l$ of the electro-magnetic clutch is excited by current supplied through the medium of the leads $m$, $m$, forming a magnetic field which extends between the parts $g$ and $h$ and magnetically couples these parts.

The casing $g$ is so formed that the same encloses the disc-shaped coupling member $h$ and together therewith constitutes a chamber surrounding the coil $l$ and the one-way clutch in dust-proof fashion.

It will be understood that no restriction is made to the specific form of embodiment shown, and that various modifications are quite possible within the meaning of the above description and the annexed claims without departing from the spirit of the invention.

What I claim as new and desire to secure by Letters Patent is:

1. In a compound clutch for co-axial shafts, a one-way clutch for the one direction of rotation, an electro-magnetic clutch for the opposite direction of rotation, teeth on the outer periphery of the one element of the electro-magnetic clutch, a casing for the coil of the second coupling element of the electro-magnetic clutch, and pawls for the one-way clutch mounted on the inner periphery of the said casing.

2. A compound clutch for connecting co-axial driving and driven shafts comprising a one-way clutch operating automatically to form a positive connection for one direction of rotation and an electro magnetic clutch operative to magnetically couple said shafts for operation in the opposite direction.

3. In a compound clutch for coaxial shafts comprising a one-way clutch operating automatically to form a positive connection for one direction of rotation and an electro magnetic clutch operative to magnetically couple said shafts for operation in the opposite direction of rotation, a disc-shaped coupling member on one of said shafts and a casing on the other of said shafts, said disc and casing forming part of the magnetic circuit of said electro magnetic clutch and cooperating in forming a housing for said one-way clutch.

4. A compound clutch for coaxial shafts comprising a one-way clutch operating automatically to form a positive connection for rotation in one direction and an electro magnetic clutch for operation in the opposite direction, said electro magnetic clutch having a magnetic circuit comprising parts on each of said shafts cooperating in forming a housing for said one-way clutch.

5. In a compound clutch for coaxial shafts, a disc on one of said shafts, a casing on the other of said shafts cooperating with said disc to form a housing; a coil in said housing for magnetizing said casing and disc to form a magnetic clutch and cooperating means in said housing operating automatically to form a positive drive in one direction of rotation.

In testimony whereof I have signed my name to this specification.

JUSTIN BAUGNÉE.